(12) United States Patent
Ross (10) Patent No.: US 7,017,784 B2
(45) Date of Patent: Mar. 28, 2006

(54) DISPENSING SYSTEM FOR ICE CREAM MACHINE

(75) Inventor: Harold F. Ross, Bark River, MI (US)

(73) Assignee: Ross's Manufacturing, LLC, Escanaba, MI (US)

(*) Notice: Subject to any disclaimer, the term of this patent is extended or adjusted under 35 U.S.C. 154(b) by 244 days.

(21) Appl. No.: 10/464,425

(22) Filed: Jun. 18, 2003

(65) Prior Publication Data

US 2004/0256407 A1 Dec. 23, 2004

(51) Int. Cl.
*G01F 11/10* (2006.01)

(52) U.S. Cl. ...................... 222/367; 251/310
(58) Field of Classification Search .......... 222/1, 222/367; 251/309, 310; 426/565
See application file for complete search history.

(56) References Cited

U.S. PATENT DOCUMENTS

| 1,529,063 | A | * | 3/1925 | Gundry et al. ............ 251/184 |
| 1,791,914 | A | * | 2/1931 | Tomlinson ................ 251/184 |
| 1,898,577 | A | * | 2/1933 | Ford ....................... 251/183 |
| 1,907,641 | A | | 5/1933 | Askin |
| 1,911,464 | A | | 5/1933 | Pearson |
| 2,349,367 | A | | 5/1944 | Muffly |
| 2,702,460 | A | | 2/1955 | Gaugler |
| 2,887,072 | A | * | 5/1959 | Watkins ................... 251/310 |
| 3,184,217 | A | * | 5/1965 | Petrin ..................... 251/367 |
| 3,928,646 | A | | 12/1975 | Hartley |
| 4,019,689 | A | | 4/1977 | Hunt |
| 4,703,628 | A | | 11/1987 | Togashi et al. |
| 5,292,030 | A | * | 3/1994 | Kateman et al. ............ 62/74 |
| 2003/0061830 | A1 | | 4/2003 | Ross |

* cited by examiner

Primary Examiner—Philippe Derakshani
(74) Attorney, Agent, or Firm—Foley & Lardner LLP (57) ABSTRACT

A dispensing system for a tank for mixing and freezing ice cream includes a valve selectively pivotable between a first position, a second position and a third position. Pivoting the valve between the first position, the second position and the third position valve meters the flow of the ice cream from the tank. A method of dispensing ice cream includes pivoting a handle to an off position, thereby obstructing with a valve an aperture between the tank and the container. The method also includes pivoting the handle to an on position, thereby aligning the aperture with an aperture of the valve. The method also includes pivoting the handle to an intermediate position between the off position and the on position. Pivoting between the on position and the off position pivots the valve to regulate the flow of the ice cream from the tank to the storage unit.

24 Claims, 6 Drawing Sheets

DISPENSING SYSTEM FOR ICE CREAM MACHINE

FIELD

The present application relates to a dispensing system. More particularly, the present invention relates to a dispensing system for an ice cream machine.

BACKGROUND OF THE INVENTION

It is generally known to provide an ice cream making machine. The ice cream is agitated and frozen in a batch mixing chamber or barrel of such conventional ice cream making machines so that the quantity of ice cream is produced as the result of one operation. A "gate" or "knife" valve of such conventional ice cream making machines dispenses the ice cream from the barrel to a container. Such ice cream making machines typically provide ice cream when such valve is slid from a "down" or closed position to an "up" or opened position. However, such conventional machines for making ice cream have several disadvantages including that they are not selectively reconfigurable to "meter" or regulate the amount or proportion of ice cream provided from the freezer to the container.

Therefore, there is a need for a machine for making ice cream that can regulate the amount of ice cream provided from the freezer to the container. Further, there is a need for a machine for making ice cream having a valve that is selectively reconfigurable to easily manipulate the output of ice cream from the batch freezer to the container. Further, there is a need for a dispensing system that meters the flow of ice cream from the freezer to the tank. Further still, there is a need for a machine for making ice cream having a valve that is quickly and easily disassembled for cleaning. Yet further, there is a need for a dispensing system for an ice cream machine having one or more of these or other advantageous features.

SUMMARY OF THE INVENTION

One embodiment relates to a dispensing system for a tank for mixing and freezing ice cream. The system comprises a valve selectively pivotable between a first position, a second position and a third position. Pivoting the valve between the first position, the second position and the third position valve meters the flow of the ice cream from the tank.

Yet another exemplary embodiment relates to a system for dispensing ice cream from a machine for making ice cream having a tank for mixing and freezing the ice cream. The system comprises means for regulating the amount of ice cream provided from the freezer to the container. The system also comprises means for actuating the means for regulating. Pivoting the means for actuating pivots the means for regulating so that an aperture between the tank and a storage container is at least partially obstructed by the means for regulating. Pivoting the means for actuating pivots the means for regulating also at least partially aligns the aperture with the means for regulating to meter the flow of the ice cream from the tank to the container.

Still another exemplary embodiment relates to a method of dispensing ice cream from a tank for mixing and freezing the ice cream to a container. The method comprises pivoting a handle to an off position, thereby obstructing with a valve an aperture between the tank and the container. The method also comprises pivoting the handle to an on position, thereby aligning the aperture with an aperture of the valve. The method also comprises pivoting the handle to an intermediate position between the off position and the on position. Pivoting between the on position and the off position pivots the valve to regulate the flow of the ice cream from the tank to the storage unit.

BRIEF DESCRIPTION OF THE DRAWINGS

Exemplary embodiments will hereafter be described with reference to the accompanying drawings, wherein like numerals denote like elements, and.

DETAILED DESCRIPTION OF THE PREFERRED EXEMPLARY EMBODIMENTS

Figure 1:
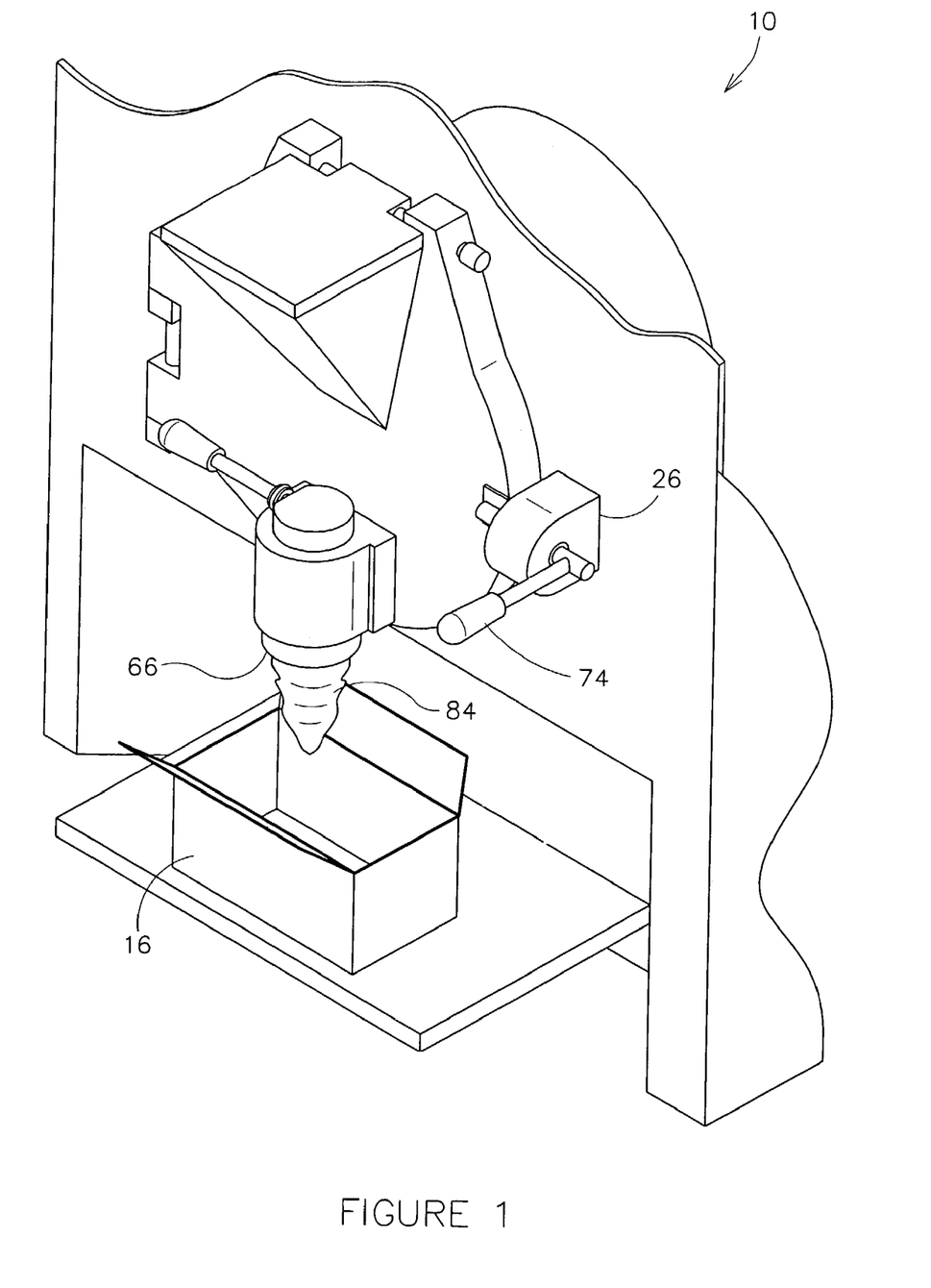
FIG. 1 is a fragmentary perspective view of a machine for making ice cream according to an exemplary embodiment.
Figure 3:
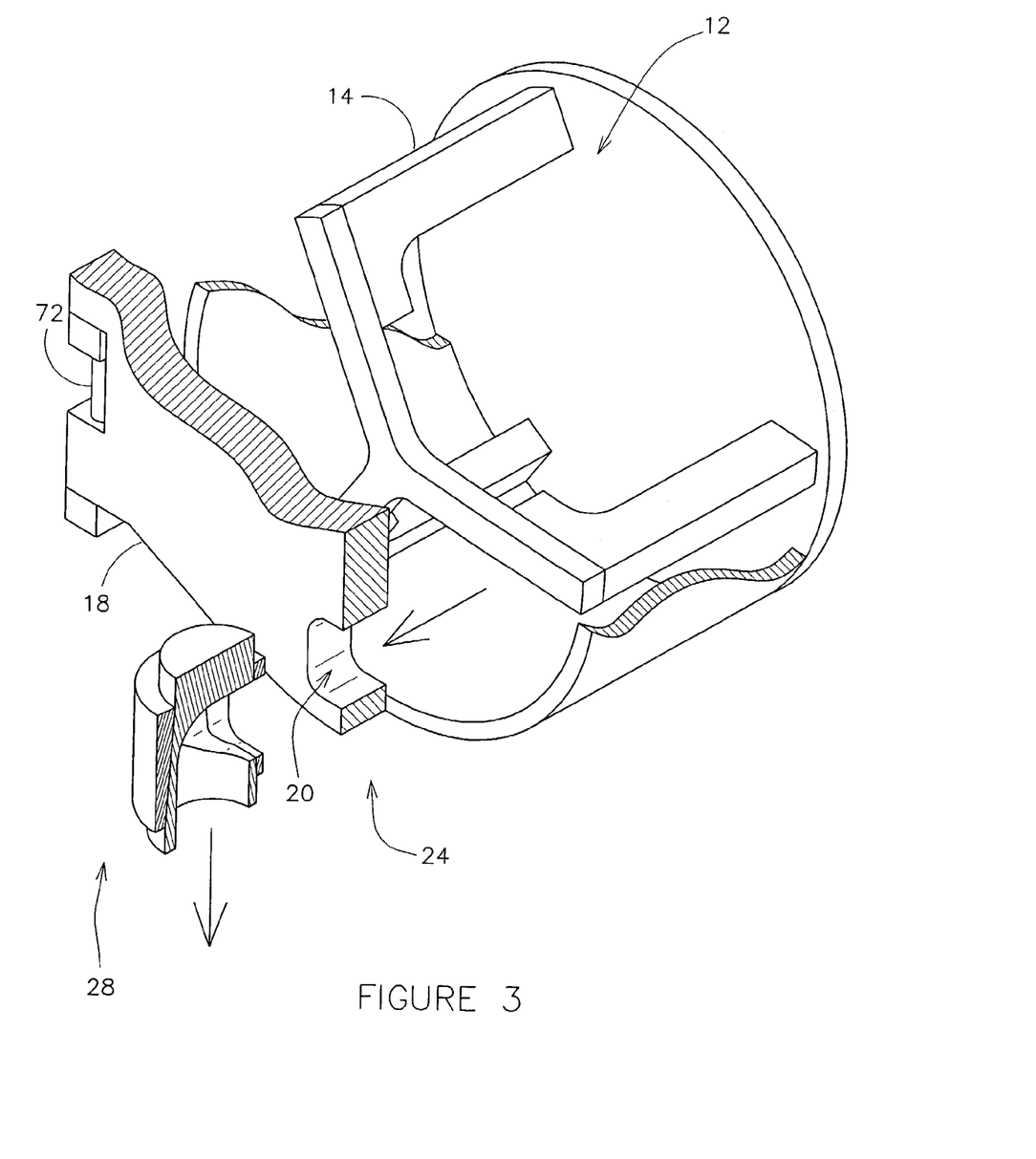
FIG. 3 is a fragmentary schematic view of the machine for making ice cream of FIG. 1 showing the door in a closed position according to an exemplary embodiment.

A system of making custard or ice cream is shown in FIG. 1 as a batch freezer or machine for making ice cream 10 according to an exemplary embodiment. Ice cream making machine 10 includes a storage area or barrel tank 12 in which a batch of liquid ice cream is mixed with a mixer or auger 14 as shown in FIG. 3. The liquid ice cream is frozen in tank 12 so that a thick or solid consistency is achieved. A dispensing system 30 provides solidified ice cream 84 from tank 12 to a storage unit or collector 16 such as a pint or one gallon container (see FIG. 4).

According to a particularly preferred embodiment, the machine for making ice cream is a batch freezer having a capacity of about 20 quarts (or about 40 quarts according to an alternative embodiment). According to a particularly preferred embodiment, the machine for making ice cream is a model no. BA-20 batch freezer commercially available from Ross's Manufacturing of Escanaba, Mich., the assignee of the present application. According to an alternative embodiment, the machine for making ice cream is of the type disclosed and described in U.S. patent application Ser. No. 222754 titled "Ice Cream Machine Having An Auxiliary Evaporator Tank" filed Aug. 16, 2002 listing inventor Harold F. Ross of Bark River, Mich. According to another alternative embodiment, the machine for making ice cream is a model number 101W single barrel frozen custard machine commercially available from Ross's Manufacturing of Escanaba, Mich.

Figure 2:
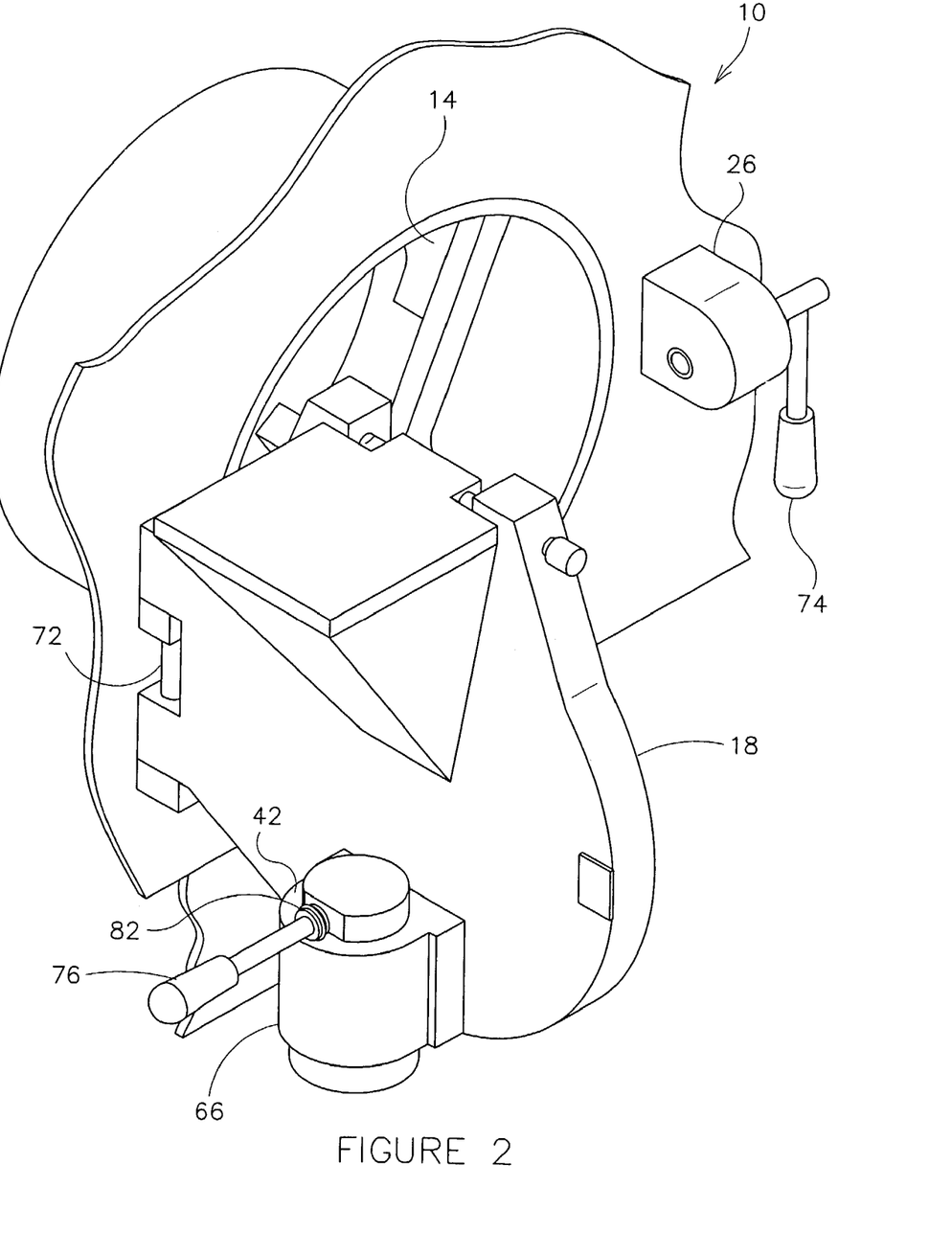
FIG. 2 is a fragmentary perspective view of the machine for making ice cream of FIG. 1 showing a door in an opened position according to an exemplary embodiment.

Referring further to FIGS. 2 and 3, a partition wall (shown as a door 18) separates tank 12 from an outlet or port 66 for the collection of solidified ice cream 84. Door 18 includes an access opening or orifice (shown as an aperture 20) for providing solidified ice cream 84 from tank 12 to port 66. According to a particularly preferred embodiment, the aperture of the door has a square shape with a width of about 2.44 inches, a length of about 2.37 inches and rounded corners having a radius of about 0.5 inches.

Door 18 is selectively positionable about a hinge 72 by a handle 74. In a closed position 24 of door 18 (see FIG. 3), tank 12 is substantially sealed for the freezing of the liquid ice cream. A locking mechanism 26 secures door 18 in closed position 24 according to a preferred embodiment as shown in FIG. 1. In an opened position 28 of door 18 (see FIG. 2), access is provided to tank 12. Access to tank 12 is useful for cleaning liquid and solidified ice cream from tank 12, auger 14 and dispensing system 30 according to an exemplary embodiment.

Figure 7A:
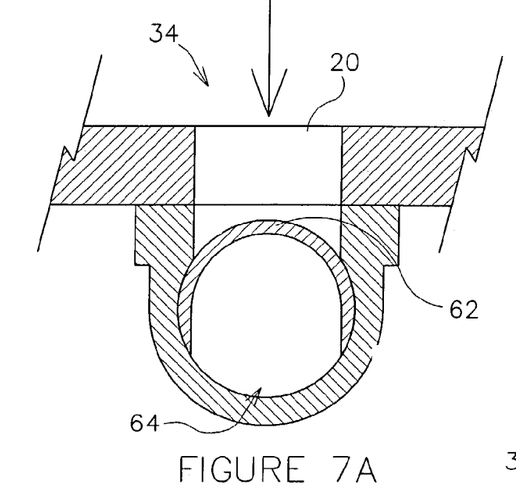
FIG. 7A is a sectional view of the ice cream dispensing system of FIG. 4 showing a valve system in a closed position according to an exemplary embodiment.
Figure 7B:
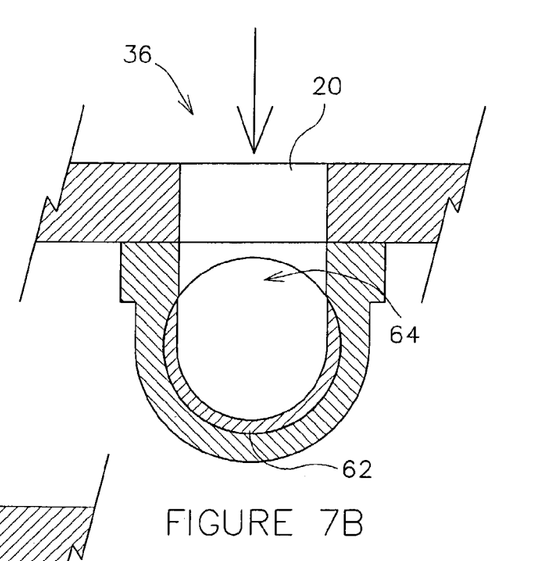
FIG. 7B is a sectional view of the ice cream dispensing system of FIG. 4 showing the valve system in an opened position according to an exemplary embodiment.

Referring to FIGS. 2 and 3, dispensing system 30 is shown attached to door 18 according to a preferred embodiment. Dispensing system 30 includes a means for regulating the amount of ice cream provided from the freezer to the container or valve system 32. A means for actuating the valve (shown as a handle 76) pivots to selectively reconfigure valve system 32 between a closed position 34 (see FIG. 7A), an opened position 36 (see FIG. 7B) and an intermediate position 38 (see FIG. 7C).

Handle 76 may be pivoted in any of a variety of positions between closed position 34 and opened position 36. Handle 76 is pivoted along a horizontal plane in a relatively smooth motion according to a preferred embodiment and may be reconfigurable between other position (e.g. along a vertical plane) according to other alternative embodiments. The incremental movement of the handle (which may be "indexed" according to an alternative embodiment) between these positions to allow for the regulating or metering of the amount of solidified ice cream that is provided through port 66. For example, the pivoting of the handle by about 10 degrees from the closed position causes about a 10 percent alignment or opening of the space between the aperture of the door and the aperture of the plug—so that a lower proportion of the solidified ice cream is provided than when the handle is pivoted about 40 degrees from the closed position. According to a preferred embodiment, the proportion of ice cream provided from the ice cream making machine may be predetermined depending on the position of the handle between an "off" or closed position and an "on" or opened position.

Handle 76 includes a tensioning device or fastener (shown as a threaded male portion 78) attached to a female threaded portion 80 of plug 50. A seal or washer 82 on handle 76 provides for camming action of handle 76 relative to a body 40 of valve system 32. Handle 76 and fastener 78 assist in maintaining the position of plug 50 relative to body 40, which assists in forming a seal between body 40 and plug 50 to inhibit the leakage of ice cream. According to a particularly preferred embodiment, the handle of the valve and the handle for the door have a "matching" or similar appearance in size, shape, color etc. and may have other similar or different aesthetic qualities according to alternative embodiments.

Figure 4:
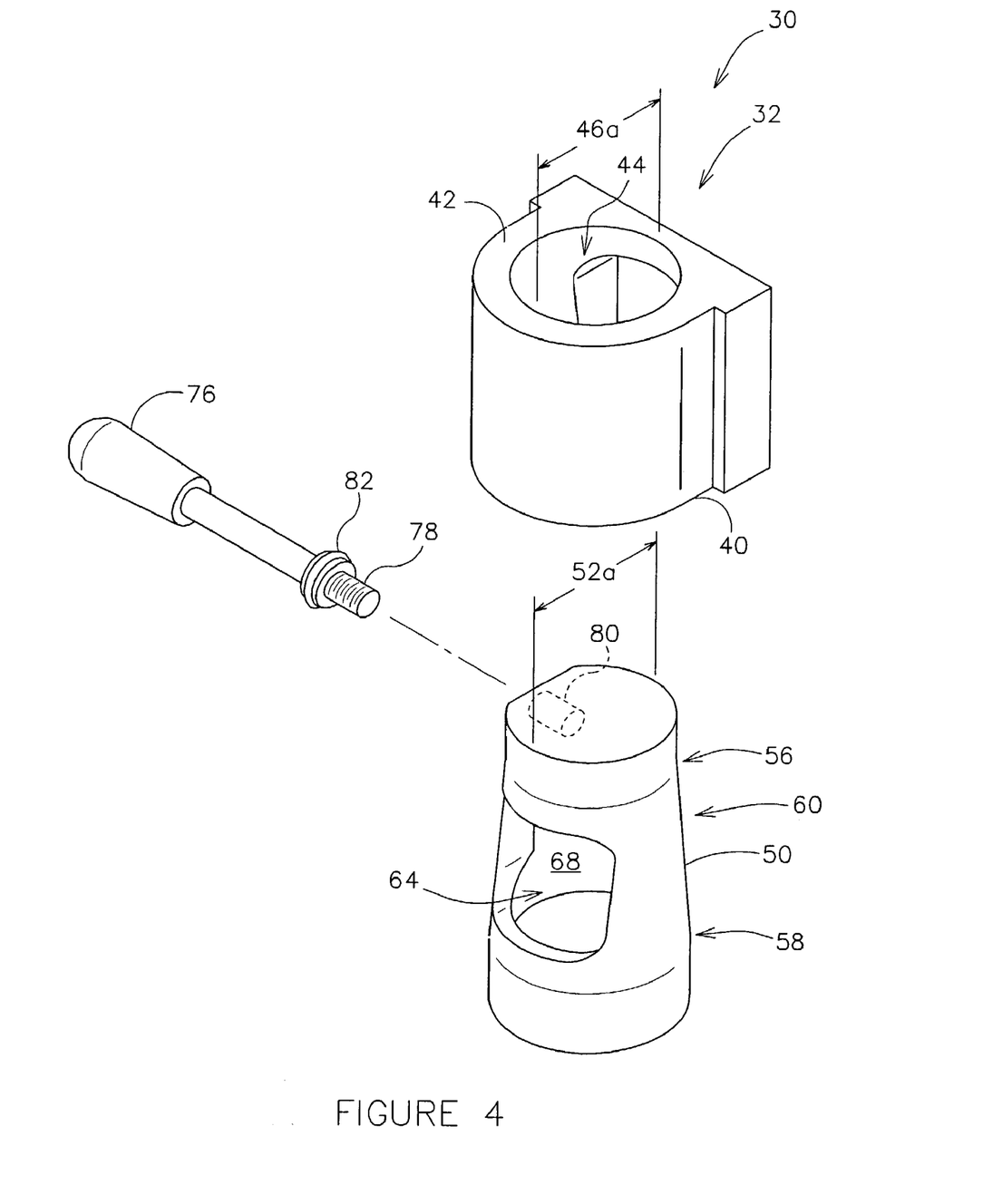
FIG. 4 is an exploded perspective view of a dispensing system of the machine for making ice cream of FIG. 1 according to a preferred embodiment.
Figure 5:
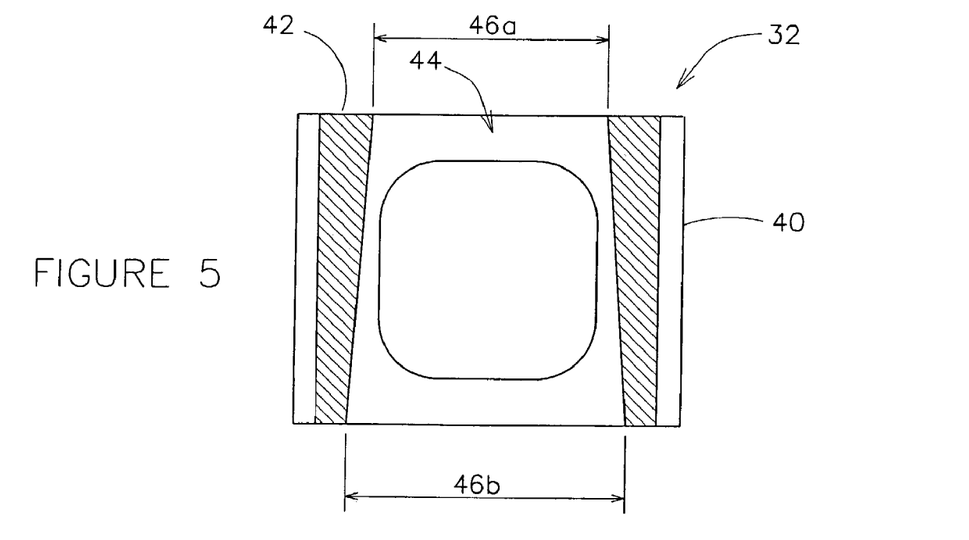
FIG. 5 is a sectional view of a body of the dispensing system of FIG. 4 according to a preferred embodiment.

Valve system 32 is reconfigurable between closed position 34 and opened position 36 by pivoting handle 76. Valve system 32 includes body 40 in which a plug 50 is nested. As shown in FIG. 4, body 40 comprises a cylindrical shaped ring 42 having a cavity 44. Cavity 44 of ring 42 is tapered such that it has an upper diameter 46a less than a lower diameter 46b as shown in FIG. 5. The shape and taper of ring 42 corresponds to the shape and taper of plug 50, so that plug 50 may be "nested" or fit within ring 42 according to a preferred embodiment as shown in FIG. 1 through FIG. 3. An interference fit between ring 42 and plug 50 provides a seal that inhibits the leakage of the ice cream through valve system 32 according to a preferred embodiment as shown in FIG. 1. According to a particularly preferred embodiment, the upper diameter of the cavity of the ring is about 2.7 inches and the lower diameter of the cavity of the ring is about 3.19 inches.

Figure 6:
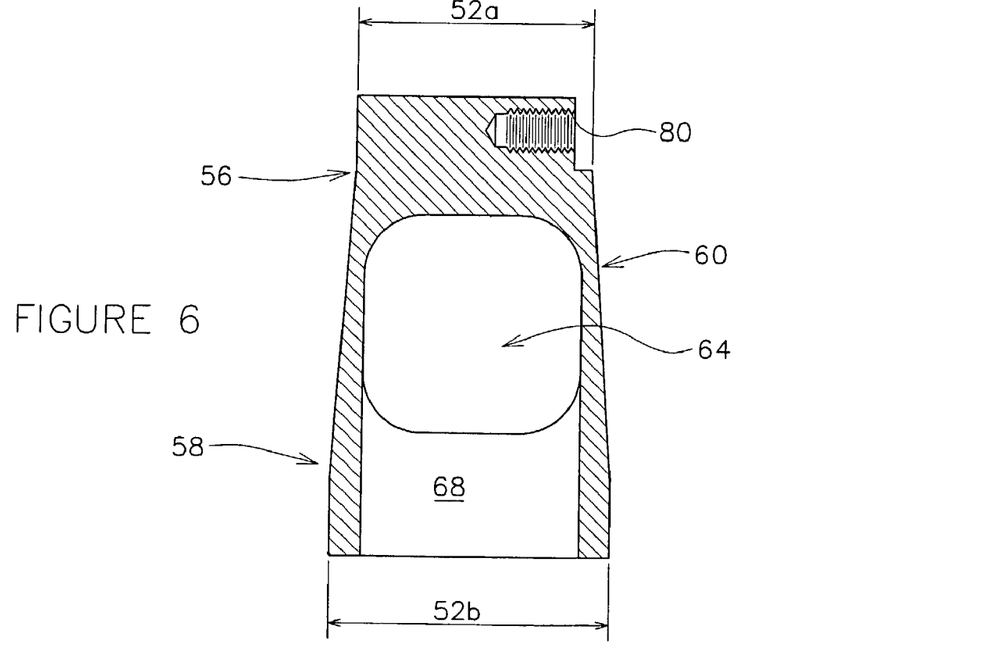
FIG. 6 is a sectional view of a plug of the dispensing system of FIG. 4 according to a preferred embodiment.

As shown in FIG. 4, plug 50 comprises a conical or frustocontical shaped wedge configured to fit securely into ring 42. Plug 50 has an upper diameter 52a less than a lower diameter 52b according to a preferred embodiment. Upper diameter 52a is associated with an upper portion 56 of plug 50 (see FIG. 6) Upper portion 56 of plug 50 extends at least partially though upper diameter 46b of cavity 44 according to a preferred embodiment as shown in FIG. 4. Lower diameter 52b of plug 50 is associated with a lower portion 58 of plug 50 (see FIG. 6). Lower portion 58 of plug 50 extends at least partially though lower diameter 48 of cavity 44 according to a preferred embodiment as shown in FIG. 46b if body 40. An intermediate portion 60 of plug 50 is wholly nested within cavity 44 of ring 42 to create the seal between plug 50 and ring 42 according to a preferred embodiment as shown in FIG. 1. According to a particularly preferred embodiment, the upper diameter of the plug is about 2.49 inches and the lower diameter of the plug is about 3.19 inches.

Plug 50 includes an outer wall 62 and a cut-out or aperture 64 in wall 62. Aperture 64 provides access to a hollowed out portion or cavity 44 of plug 50. Aperture 64 of plug 50 has a size and shape corresponding to the size and shape of aperture 20 of door 18. According to a particularly preferred embodiment, the aperture of the plug has a square shape with a width of about 2.49 inches, a length of about 2.37 inches and rounded corners having a radius of about 0.5 inches. The cavity of the plug has a rounded corner with a radius of about 1.5 inches according to a particularly preferred embodiment. The plug has a height of about 5.38 inches according to a particularly preferred embodiment.

In closed position 34, wall 62 of plug 50 obstructs aperture 20 of door 18 so that substantially no ice cream is provided from tank 12 to valve system 32. Handle 76 may be pivoted to pivot plug 50 from closed position 34 (see FIG. 7A) to opened position 36 (see FIG. 7B). In opened position 36, aperture 64 of plug 50 is aligned with aperture 20 of door 18 so that a substantially uninhibited flow of ice cream is provided from tank 12 through port 66 of dispensing system 30.

When valve system 32 is in opened position 36, the ice cream flows horizontally from tank 12 through aperture 20 of door 18. The ice cream then flows through aperture 64 in plug 50. The ice cream then hits or engages a curved inner wall 68 of cavity 44 and is forced downward (at least about 60 degrees according to a suitable embodiment and about 90 degrees according to a particularly preferred embodiment) toward port 66. The ice cream then exits port 66 and is collected in container 16.

Figure 7C:
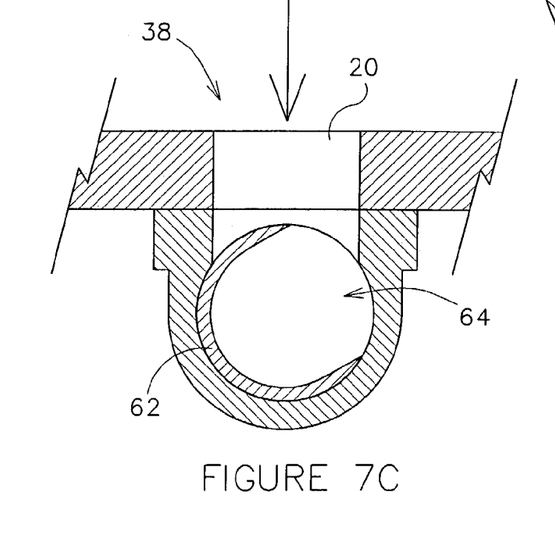
FIG. 7C is a sectional view of the ice cream dispensing system of FIG. 4 showing the valve system in an intermediate position according to an exemplary embodiment.

Handle 76 may also be pivoted to pivot plug 50 from closed position 34 (see FIG. 7A) or opened position 36 (see FIG. 7B) to intermediate position 38 (see FIG. 7C). In intermediate position 38, wall 62 of plug 50 partially obstructs aperture 20 of door 18, and aperture 64 of plug 50 is partially aligned with aperture 20 of door 18 (e.g. like a ball valve). In intermediate position 38, less ice cream is provided from tank 12 through port 66 than when plug 50 is in opened position 36. In one embodiment, a detent mechanism may be used to lock handle 76 in intermediate position 38, opened position 36 or closed position 34. The top surface of ring 32 can include indentations corresponding to positions 34, 36 and 38. Washer 82 can ride along ring 38 and rest in the indentations. According to a preferred embodiment, there is frictional engagement and interference between the handle and the body to assist in maintaining the position of the handle relative to the body.

According to a particularly preferred embodiment, the plug, the ring and the door are made of food grade plastic and are quickly and easily cleaned. According to another embodiment, O-ring seals are not necessary in the dispensing system to inhibit the leakage of ice cream.

It is understood that while the detailed descriptions, specific examples, material types, thickness, dimensions, and shapes discussed provide preferred exemplary embodiments of the present invention, the preferred exemplary embodiments are for the purpose of illustration only. For example, the dispensing system may be used with an ice cream making machine, or other machines for dispensing ice cream after it is made according to alternative embodiments. The method and the system of the present invention are not limited to the precise details and conditions disclosed. Various changes will be made to the details disclosed without departing from the scope of the invention, which is defined by the following claims.

What is claimed is:

1. A dispensing system for a tank for mixing and freezing ice cream, comprising:
   a valve selectively pivotable between a first position, a second position and a third position, wherein the valve includes a plug, the plug having an upper perimeter and a lower perimeter, the upper perimeter being smaller than the lower perimeter;
   wherein pivoting the valve between the first position, the second position and the third position valve meters the flow of the ice cream from the tank.

2. The system of claim 1 wherein the valve obstructs an aperture in a partition between the tank and a storage unit when the valve is in the first position, and a maximum amount of ice cream is provided through the aperture when the valve is in the second position.

3. The system of claim 2 wherein the third position is an intermediate position between the first position and the second position.

4. The system of claim 2 wherein the valve is actuated by a handle.

5. The system of claim 4 wherein the valve comprises a ball valve.

6. The system of claim 4 wherein The valve comprises a hollow plug having an aperture.

7. The system of claim 6 further comprising a body having a cavity configured for insertion of the plug.

8. The system of claim 7 wherein the plug is configured to pivot relative to the body between the first position, the second position and the third position.

9. The system of claim 8 wherein the handle is configured to pivot the plug between the first position, the second position and the third position.

10. The system of claim 8 wherein the aperture of the plug has a shape corresponding to a shape of the aperture of the partition.

11. The system of claim 10 wherein the plug obstructs the aperture of the partition when the valve is in the first position.

12. The system of claim 11 wherein the aperture of the plug is aligned with the aperture of the partition when the valve is in the second position.

13. The system of claim 12 wherein the aperture of the partition is at least partially obstructed by the plug and at least partially aligned with the aperture of the plug when the valve is in the intermediate position.

14. The system of claim 13 wherein the plug has a conical shape.

15. The system of claim 13 wherein the plug has a tapered shape.

16. The system of claim 13 wherein the plug has a frustoconical shape.

17. A system for dispensing ice cream from a machine for making ice cream having a tank for mixing and freezing the ice cream, comprising:
   means for regulating the amount of ice cream provided from the freezer to the container, the means for regulating consisting of a single piece ring and a single piece plug;
   means for actuating the means for regulating, the means for actuating being attached directly to the single piece plug;
   wherein pivoting the means for actuating pivots the means for regulating so that an aperture between the tank and a storage container is at least partially obstructed by the means for regulating and the aperture is at least partially aligned with the means for regulating to meter the flow of the ice cream from the tank to the container.

18. The system of claim 17 wherein the means for regulating comprises a valve selectively reconfigurable between a first position and a second position.

19. The system of claim 18 wherein to means for regulating comprises a ball valve.

20. The system of claim 18 wherein the valve comprises a plug having an aperture that is aligned with the aperture in the partition when the valve is in the first position, and the plug obstructs the aperture in the partition when the valve is in the second position.

21. The system of claim 20 wherein the means for actuating comprises a handle selectively pivotable between a first position and a second position.

22. A method of dispensing ice cream from a tank for mixing and freezing the ice cream to a container, comprising:
   pivoting a handle to an off position, thereby obstructing with a valve an aperture between the tank and the container, the handle being in rolling or sliding engagement with a top surface of member of the valve;
   pivoting the handle to an on position, thereby aligning the aperture with an aperture of the valve;
   pivoting the handle to an intermediate position between the off position and the on position;
   wherein pivoting between the on position and the off position pivots the valve to regulate the flow of to ice cream from the tank to the storage unit.

23. The method of claim 22 wherein pivoting the handle from the off position to the on position redirects the flaw of the ice cream from a horizontal direction from freezer to a vertical direction from the valve.

24. The method of claim 23 wherein pivoting the handle from the off position to the on position redirects the flow of the ice cream at least about 60 degrees.

* * * * *

UNITED STATES PATENT AND TRADEMARK OFFICE
CERTIFICATE OF CORRECTION

PATENT NO. : 7,017,784 B2
APPLICATION NO. : 10/464425
DATED : March 28, 2006
INVENTOR(S) : Harold F. Ross It is certified that error appears in the above-identified patent and that said Letters Patent is hereby corrected as shown below:

Column 5, claim 6, line 53, replace "The valve" with --the valve--.

Column 6, claim 19, line 34, replace "to" with --the--.

Column 6, claim 22, line 50, before member insert --a--.

Column 6, claim 22, line 57, replace "to ice" with --the ice--.

Column 6, claim 23, line 60, replace "flaw" with --flow--.

Signed and Sealed this

Eleventh Day of July, 2006

JON W. DUDAS
*Director of the United States Patent and Trademark Office*